Patented Sept. 7, 1937

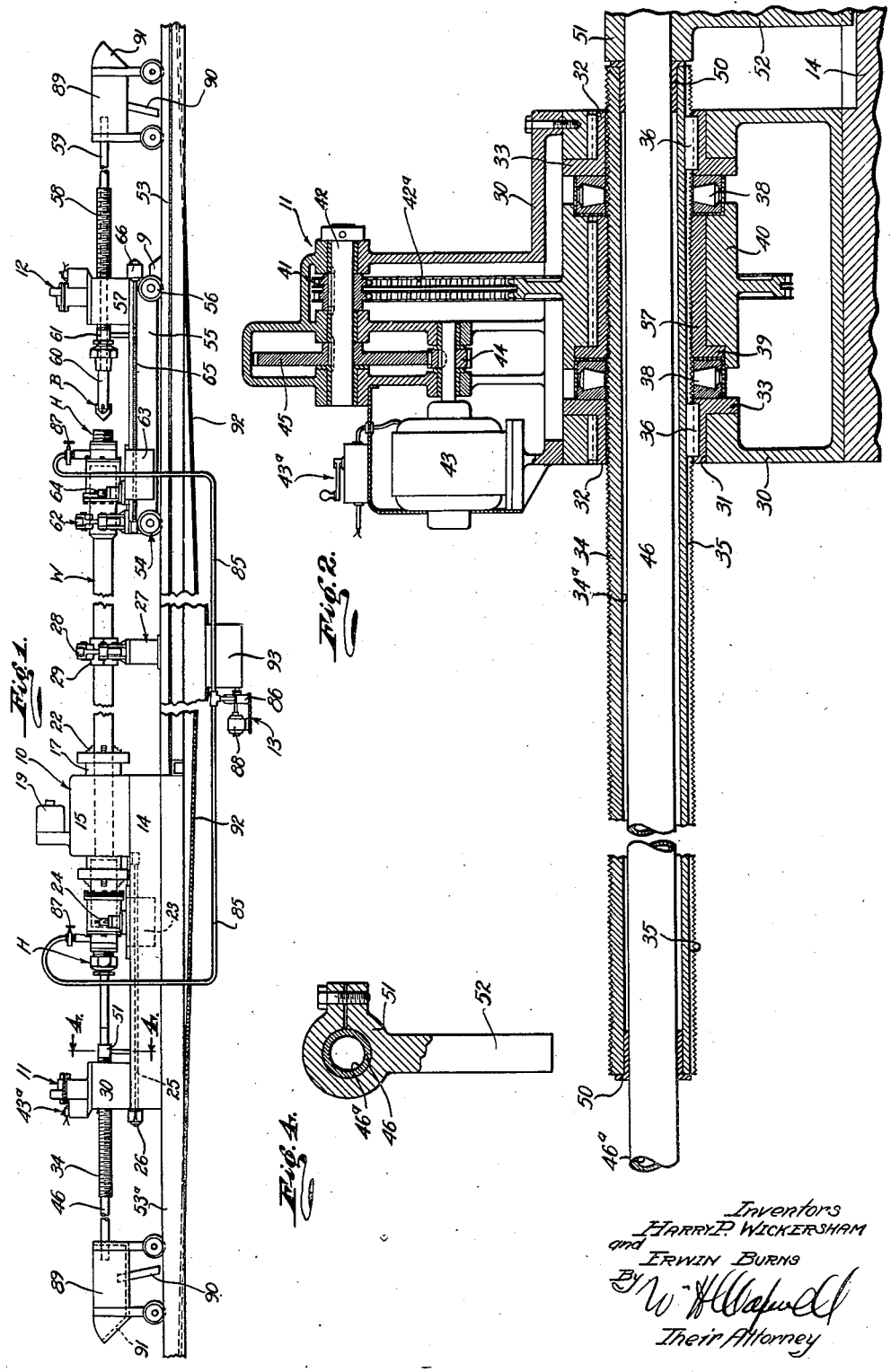

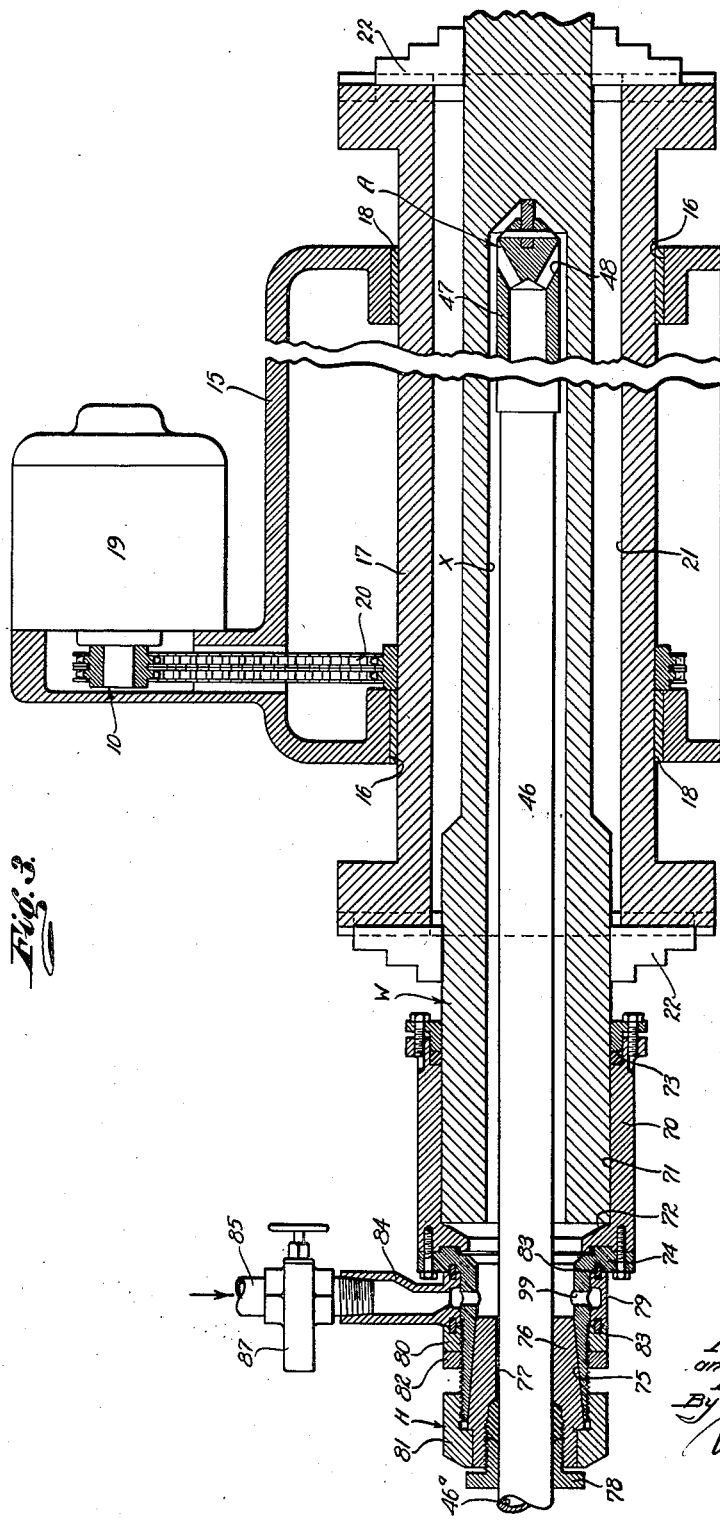

2,092,101

UNITED STATES PATENT OFFICE 2,092,101

BORING MACHINE

Harry P. Wickersham, Huntington Park, and Erwin Burns, Los Angeles, Calif., assignors to Baash-Ross Tool Company, Los Angeles, Calif., a corporation of California Application March 12, 1935, Serial No. 10,614

1 Claim. (Cl. 77—3)

This invention relates to drilling or boring apparatus and relates more particularly to a machine for boring longitudinal openings in members of great length such as kellies or drill stems.

A general object of the invention is to provide a practical effective machine for drilling longitudinal bores through members of great length.

Another object of the invention is to provide a boring machine that is operable to drill a straight central longitudinal opening in a long member or piece of work.

Another object of the invention is to provide a boring machine of the character mentioned that is rapid and effective in operation embodying drills that bore into the work from its opposite ends.

Another object of the invention is to provide a boring machine of the character mentioned in which the work is rotated while the drills are fed into its opposite ends whereby the longitudinal opening is rapidly drilled by rotating or driving the work.

Another object of the invention is to provide a boring machine of the character mentioned that is readily and quickly adaptable to handle work of various lengths.

Another object of the invention is to provide a boring machine of the character mentioned that includes a novel and particularly effective circulation system for cooling the drills and for carrying the cuttings away from the drills.

A further object of the invention is to provide a boring machine of the character mentioned that is simple and inexpensive to operate.

The various objects and features of our invention will be fully understood from the following detailed description of a typical preferred form and application of the invention, throughout which description reference is made to the accompanying drawings, in which:

Fig. 1 is a more or less diagrammatic side elevation of the machine provided by the present invention showing one of the drills about to be entered in the work. Fig. 2 is an enlarged vertical detailed sectional view of one of the feed means. Fig. 3 is an enlarged vertical detailed sectional view of the drive means for rotating the work and Fig. 4 is an enlarged vertical detailed sectional view of one of the thrust clamps being a view taken substantially as indicated by line 4—4 on Fig. 1.

The boring machine provided by this invention includes, generally, means 10 for driving or rotating the work W, a relatively stationary means 11 for feeding a drill A into one end of the work W, mobile or shiftable means 12 for feeding a drill B into the other end of the work and means 13 for circulating fluid to the drills A and B to cool the same and to remove the cuttings The means 10 is operable to rotate the piece of work W about its longitudinal axis and to support and steady the work during its rotation. The means 10 includes a base or bed 14 and a driving head housing 15 on the bed. The housing 15 may be positioned adjacent one end of the bed 14 and its opposite end walls are provided with aligned horizontal openings 16. A tubular driving spindle 17 extends through the openings 16 and is rotatably supported therein by bearings or bushings 18. Means is provided for driving or rotating the tubular spindle 17. In the particular embodiment of the invention illustrated in the drawings the spindle driving means includes an electric motor 19 carried by the housing 15 and adapted to rotate the spindle 17 through the medium of a chain and sprocket drive 20. The longitudinal opening 21 of the tubular spindle 17 is sufficiently large in diameter to receive the work W with substantial clearance and the work is adapted to be arranged through the spindle to project from its opposite ends. One or more chucks 22 are provided on the tubular spindle 17 to engage the work W. In the preferred construction a chuck 22 is provided at each end of the tubular spindle 17 to grip the work W for rotation with the spindle.

Means is provided on the bed 14 for turning one end portion of the work W and for facing off the end of the work. A carriage 23 is shiftable longitudinally on the bed 14 and carries a tool post or holder 24 for holding tools for turning the end portion of the work W and for facing the end of the work. The work W is preferably arranged to have one end portion project from the inner end of the spindle 17 so that it may be finished or turned by a suitable tool in the tool holder 24. The carriage 23 may be operated on the bed 14 in a suitable manner, for example, the carriage may be shifted by a feed screw 25 operated by a motor 26 or other drive. Due to the great length of the work W which may be 60 feet or more in length it is desirable to provide means for supporting and guiding its projecting major portion. One or more steady rests 27 may be provided to carry and support the major portion of the work W at longitudinally spaced points. The typical steady rest 27 illustrated has spaced rollers 28 and an adapter bushing 29 having a polygonal opening receiving the work W is arranged in the steady rest to cooperate with its rollers 28. During the boring or drilling operation the work W is continuously rotated by the driving spindle 17 and is rotatably supported at spaced points by the steady rests 27.

The means 11 which is relatively fixed or stationary with respect to the drive means 10 is operable to feed the drill A into an end of the rotating work W. The feed means 11 includes a casing or housing 30 mounted on the bed 14 in spaced relation to the housing 15. Horizontal openings 31 are provided in the opposite side walls of the housing 30 and are horizontally and longitudinally aligned with the openings 16 in the housing 15. Bushings 32 are keyed in the openings 31 and have radial flanges 33 on their inner ends bearing against the walls of the housing 30. A tubular feed screw or feed tube 34 extends through the bushings 32. The feed tube 34 is axially or longitudinally shiftable and has one or more longitudinal keyways 35. Keys 36 are carried by the bushings 32 and cooperate with the keyway or keyways 35 to hold the feed tube 34 against rotation.

The feed tube 34 is threaded throughout its length or the major portion of its length. A nut 37 of substantial length has threaded engagement with the feed screw 34 and its opposite ends are adapted to react against the bushing flanges 33 through thrust bearings 38. The outer end of the nut 37, that is, the end of the nut most remote from the means 10 has a flange 39 to have extensive cooperation with the outer bearing 38. The nut 37 is driven or rotated to translate the feed tube 34. In accordance with the broader aspects of the invention the nut 37 may be rotated in any suitable or practical manner. In the case illustrated a sprocket wheel 40 is keyed to the nut 37 and is operatively connected with a sprocket 41 by a suitable chain 42ᵃ. The sprocket 41 is fixed on a shaft 42 rotatably carried by an extension of the housing 30. A reversible and variable speed motor 43 is provided on the housing 30 and its shaft carries a driving pinion 44. The motor 43 may be governed by a control 43ᵃ. A gear 45 is fixed on the shaft 42 and meshes with the pinion 44 whereby the motor 43 drives the shaft 42 to rotate the nut 37 through the chain and sprocket drive 40, 41, and 42ᵃ.

The feed means 11 includes a drill rod 46 carrying the drill A and adapted to be fed longitudinally by the feed tube 34. In accordance with the invention the drill rod 46 is tubular having a central longitudinal opening 46ᵃ extending through it from one end to the other. The rod 46 is preferably made up of a plurality of sections whereby it may be lengthened as the drilling progresses to advance or carry the drill A into the long work W. The parts or sections making up the tubular drill rod 46 may be connected by flush threaded joints. The drill A includes a drill head 47 on the inner end of the drill rod 46. The drill head 47 has spaced ports 48 which communicate with the opening 46ᵃ of the drill rod. The drill A is operable to form a bore X sufficiently large in diameter to receive the drill rod 46 with substantial clearance. The ports 48 put the inner end portion of the bore X in communication with the opening 46ᵃ of the drill rod 46. The parts or sections making up the drill rod 46 may be comparatively long, for example, they may be 12 feet in length. A drill rod section or the assembled drill rod 46 is adapted to be arranged through the feed tube 34 to project from its opposite ends. The drill rod 46 is received by the opening 34ᵃ of the feed tube 34 with suitable clearance. Bushings 50 are arranged in the opposite end portions of the opening 34ᵃ to support or carry the rod 46 at longitudinally spaced points. A thrust clamp 51 is removably and adjustably secured to the drill rod 46 to be engageable by the adjacent end of the feed tube 34 or the bushing 50 at the adjacent end of the feed tube. The clamp 51 has an arm 52 which is adapted to engage a part of the bed 14 to hold the rod 46 against rotation. Longitudinal movement of the feed tube 34 is transmitted to the drill rod 46 by the clamp 51 so that rotation of the nut 34 feeds the drill rod 46 to advance the drill A into the work W.

The feed means 12 for carrying and feeding the drill B is shiftable relative to the bed 14 to adapt the apparatus for boring work of various lengths. The means 12 includes a track comprising spaced rails 53 and a carrier or truck 54 movable along the rails. The truck 54 includes a bed or frame 55 having flanged wheels 56 cooperating with the rails 53. The frame 55 may resemble the bed of a lathe and carries a housing 57. The housing 57 may be identical with the housing 30 and the feed means 12 includes a threaded feed tube 58 projecting from opposite sides of the housing and corresponding to the feed tube 34. The feed tube 58 is operated by a mechanism in the housing 57 which may be identical with the corresponding mechanism of the feed means 11 described above and reference may be had to such description for the details of the mechanism within or carried by the housing 57. A tubular drill rod 59 extends longitudinally through the feed tube 58 and projects from its opposite ends. The drill rod 59 is made up of threadedly connected sections as required and its inner end carries the drill B. The drill B includes a ported drill head 60 similar to the drill head 47. A releasable or adjustable thrust clamp 61 is provided on the drill rod 59 and is engageable by the inner end of the feed tube 58 for feeding the drill rod 59 toward and into the work W. The clamp 61 engages the frame 55 to hold the drill rod against rotation.

The truck 54 may carry a steady rest 62 for rotatably supporting the outer end portion of the work W. A carriage 63 is shiftable longitudinally on the frame 55 and carries a tool post or tool holder 64. The carriage 63 is shifted by a feed screw 65 operated by a motor 66 or other suitable drive. The carriage 63 with its tool holder 64 provides means for turning down the end portion of the work W and for facing the end of the work. The truck 54 is readily shiftable along the rails 53 to a position where the end portion of the work may be turned as required and may be shifted, if necessary, to a position where the end of the work may be supported by the steady rest 62 and the feed means 12 is in its proper location relative to the work. Blocks 9 may be employed to hold the truck 54 in the desired position. It is believed that it will be apparent how the drills A and B may be fed into the opposite ends of the work W at the required rate while the work is being rotated by the means 10.

The means 13 circulates a suitable cutting liquid to the drills A and B. The means 13 includes swivels or circulation heads H arranged on or connected with the opposite ends of the work W. Each circulation head includes a body 70 having an opening 71 for receiving the turned cylindrical end portion of the work W. Shoulders 72 in the openings 71 engage the ends of the work W to properly position the bodies 70. Packing glands 73 are provided on the inner ends of the bodies 70 to seal with the work W. Tubular members 74 are attached to the outer ends of the bodies 70 by screws or the like, and have their outer end portions externally threaded. The outer portions of the members 74 are internally tapered as at 75 to receive correspondingly tapered tubular plugs 76. The plugs 76 have openings 77 passing the drill rods 46 and 59. Sleeves 81 are threaded on the members 74 to urge the plugs 76 into the members 74. Packing glands 78 are carried by the plugs 76 to seal about the drill rods. The interiors of the members 74 constitute chambers having communication with the bores X being drilled in the work W. Annular or tubular jackets 79 surround the unthreaded inner portions of the members 74. Nuts 80 are threaded on the members 74 to hold the jackets 79 in position. Lock nuts 82 lock the nuts 80 in place. The jackets 79 remain stationary while the members 74 rotate with the work W. Means are provided for sealing about the opposite ends of the jackets 79. Sealing rings 83 are arranged in registering grooves in the opposite ends of the jackets 79 and the opposing faces of the members 74 and nuts 80. Ports 99 in the walls of the members 74 put the jackets 79 in communication with the interiors of the members. Pipes or tubular bosses 84 project from the jackets 79 to receive the circulation liquid which is pumped into the jackets to flow through the bores X and then pass into the ports 48 and out through the openings 46a in the drill rods. Conduits or pipes 85 extend from the jacket bosses 84 to a circulation pump 86. Portions of the pipes 85 connected with the jackets 79 are preferably flexible to facilitate the assembling of the circulation heads H on the opposite ends of the work W. Suitable valves 87 are provided to control the flow through the pipes 85. The valves 87 are shown connected with the bosses 84 of the jackets 79. The pump 86 may be operated by a suitable motor 88.

Means is provided whereby the circulation fluid or cutting liquid is recovered after being discharged from the outer ends of the drill rods 46 and 59 and is re-circulated to the drills A and B. Wagons or carts 89 are provided to receive the liquid and cuttings from the outer ends of the drill rods 46 and 59. One cart 89 is operable or shiftable along the rails 53 and the other cart 89 is operable along rails 53a at the other end of the bed 14. The opposite ends of the drill rods 46 and 59 are adapted to project into the carts. Discharge pipes 90 project from the bottoms of the carts 89 to discharge the liquid. Suitable screens may be provided for the pipes 90, however the pipes 90 may project upwardly from the bottoms of the carts whereby the cuttings settle and are retained in the carts 89. The outer ends 91 of the carts 89 are sloped to permit shovels to be readily entered in the carts for the purpose of removing the cuttings. Inclined troughs 92 are provided below and between the rails 53 and 53a to receive the liquid discharged from the carts 89. The troughs 92 discharge into a common receiver sump or tank 93. The pump draws or receives the cutting liquid from the tank 93 and forces it through the pipes 85 so that there is a continuous circulation of liquid to the drills A and B.

The operation of the apparatus will be described in connection with the boring of a longitudinal opening in the drill stem or kelly indicated at W in the drawings, it being understood that this description is not to be taken as restricting the use or application of the invention. The work W is first arranged through the tubular drive spindle 17 and is engaged or gripped by the chucks 22. The work W is preferably positioned so that it has an end portion projecting from the drive spindle over the bed 14. The truck 54 is then shifted to a position where its steady rest 62 may carry an end portion of the work W. It is to be noted that the truck 54 may be shifted along the rails 53 to accommodate the apparatus to handle work varying greatly in length. Following the positioning of the truck 54 it may be set or held against movement by the blocks 9. The steady rest or rests 27 may be arranged to suitably support the work W at spaced points between its ends. The means 10 is then actuated to rotate the work W so that its end portions may be turned down and its ends faced by tools arranged in the tool posts 24 and 64. The end portions of the work are accurately turned and finished to be received in the bodies 70. Following the finishing of the end portions of the work W the drill rods 46 and 59 are passed through the feed tubes 34 and 58. The plugs 76 are arranged on the drill rods prior to the attachment of the drills A and B with the rods. The circulation head bodies 70 are arranged on the turned ends of the work W to properly receive and center the plugs 76 which in turn guide and center the drill rods. The drill rods are then advanced to enter the drills in previously formed pilot bores in the opposite ends of the work W to permit the plugs 76 to be entered in the openings 75. The sleeves 81 are threaded to the members 74 to provide for the proper sealing engagement of the plugs 76 with the members 74.

The apparatus is then in condition for operation. The pump 86 is started to circulate the cutting liquid to the drills A and B and the means 10 is actuated to rotate the work W. The feed means 11 and 12 are started and regulated to provide for the feeding of the drills A and B into the work at the desired rate. The end thrusts or pressures placed on the work W by the drills A and B are automatically balanced by the drills acting toward one another on the work. As the drilling progresses the drill rods 46 and 59 are lengthened by adding sections to their outer ends. The cutting liquid and the cuttings are passed outwardly through the openings in the drill rods 46 and 59 to discharge into the carts 89. The carts 89 may be emptied of the cuttings from time to time and the cutting liquid discharges from the cart to return to the tank 93. The feed tubes 34 and 58 are returned to their normal positions when they reach the ends of their strokes by reversing the drives of the feed means 11 and 12. The drill rods 46 and 59 are centered and guided at longitudinally spaced points by the bushings 50 and by the glands 78 and the work W is effectively supported for rotation at longitudinally spaced points so that the apparatus is effective in drilling a straight central bore through the work. The apparatus is rapid and effective in operation and is readily adaptable to handle work varying greatly in length.

Having described only a typical preferred form and application of our invention, we do not wish to be limited or restricted to the specific form and application herein set forth, but wish to reserve to ourselves any modifications or variations that may appear to those skilled in the art or fall within the scope of the following claim:

Having described our invention, we claim:

A boring machine including means for rotating an elongate piece of work, tubular drill-carrying rods, means for feeding the drill rods in the opposite ends of the work, and circulation heads to be applied to opposite ends of the work to pass cutting liquid into the outer ends of the bores in the work to flow out through the drill rods, each head including a body sealing with the work, a tubular plug in the outer end of the body sealing with the drill rod, and a jacket on the body discharging the liquid therein.

HARRY P. WICKERSHAM.
ERWIN BURNS.